United States Patent

[11] 3,614,589

[72] Inventors Ralph H. Ireland
Warminster, Pa.;
Joseph D. Segrest, Cherry Hill, N.J.
[21] Appl. No. 20,701
[22] Filed Mar. 18, 1970
[45] Patented Oct. 19, 1971
[73] Assignee The United States of America as represented by the Secretary of the Navy

[54] SINE WAVE STATIC INVERTER
8 Claims, 5 Drawing Figs.
[52] U.S. Cl. .................................................. 321/9 A,
321/27 MS
[51] Int. Cl. .................................................. H02m 1/12
[50] Field of Search ......................................... 321/9 A,
18, 27, 27 MS, DIG. 1

[56]  References Cited
UNITED STATES PATENTS
2,239,437  4/1941  Bedford ........................ 321/DIG. 1
3,031,629  4/1962  Kadri ........................... 321/27 MS
3,100,851  8/1963  Ross et al. ..................... 321/DIG. 1
3,334,292  8/1967  King et al. .................... 321/9 A
3,430,073  2/1969  Leonard ........................ 321/DIG. 1
3,458,797  7/1969  Larsen .......................... 321/27 MS Primary Examiner—William M. Shoop, Jr.
Attorneys—R. S. Sciascia and Henry Hansen ABSTRACT: A sine wave static inverter produces a sine waveform from the output of a step wave generator by removing the higher harmonics from a step waveform. A first embodiment short circuits the higher harmonic signals across the secondary winding of a transformer thus permitting only the first harmonic sine wave to reach the output. A second embodiment applies only higher harmonic signals from a generated step waveform 180° out of phase with a second generated step waveform so that only the first harmonic of the second step waveform appears at the output.

PATENTED OCT 19 1971 3,614,589

INVENTORS
RALPH H. IRELAND
JOSEPH D. SEGREST

BY
ATTORNEY

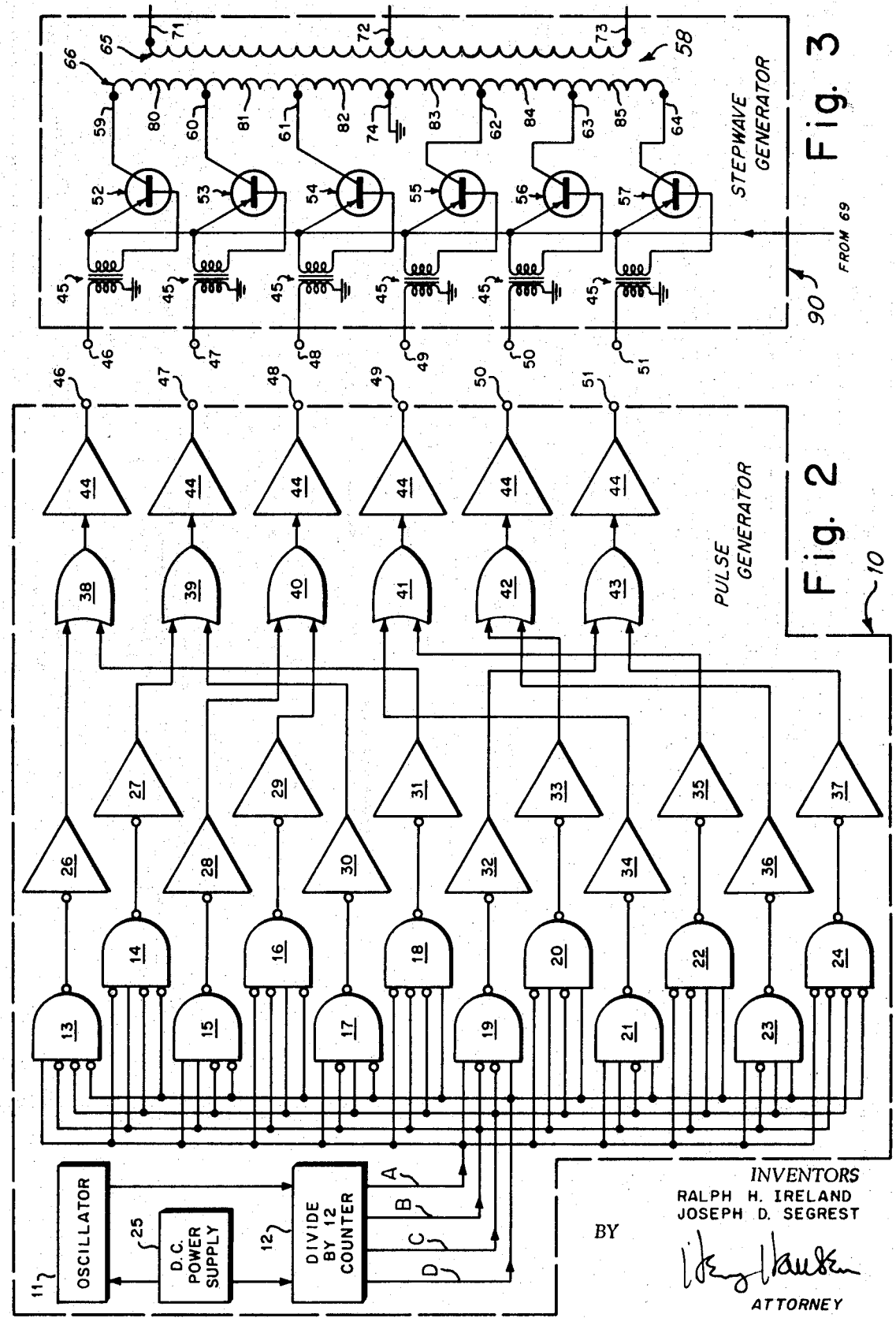

SINE WAVE STATIC INVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to DC to AC inverters, and more particularly to a novel and improved invention for providing a high-power AC supply at high altitudes without the use of rotating devices or complex static inverters.

DC motors of the prior art are used to drive AC generators with the resulting disadvantages of low efficiency, excessive weight and size, high maintenance, short life, low reliability and limitations on output power because of problems with the commutative slip rings and brushed at high altitudes. Conventional static inverters have not provided the retrofit capability required in current military aircraft.

SUMMARY OF THE INVENTION

Accordingly, it is the general purpose of the present invention to provide an AC power source of relatively simple and light construction which has none of the aforementioned limitations and disadvantages.

In both of the preferred embodiments of the invention a sine wave is generated by sequentially pulsing power transistors connected to multiple taps on the primary windings of power transformers in a manner that would normally generate multiple step waveforms in the secondary windings of the transformers. However the higher harmonics of the step waveforms are internally removed in the transformer by special connections leaving a pure sine wave output.

The first embodiment accomplished this by providing a shorting path across the secondary side of a single transformer for higher harmonic signals of a step waveform and then removing from a fraction of the secondary winding a pure sine wave.

The second embodiment provides two transformers each connected on the primary winding in such a manner to generate a step wave signal on the secondary winding. The two secondary windings are interconnected 180° out of phase with each other with a filter therebetween providing a high impedance to the first harmonic of such step waves and a low impedance to the higher harmonics. In this manner the higher harmonic signals from the second transformer are applied to the first transformer inhibiting the generation of such higher harmonic signals in the first transformer leaving a pure sine wave at the output of the first transformer.

BRIEF DESCRIPTION OF THE DRAWINGS

FIG. 2 is a schematic diagram of a pulse generator in the embodiment of FIG. 1;

FIG. 3 is a schematic diagram of a step wave generator in the embodiment of FIG. 1;

DESCRIPTION OF THE PREFERRED EMBODIMENTS

Figure 1:
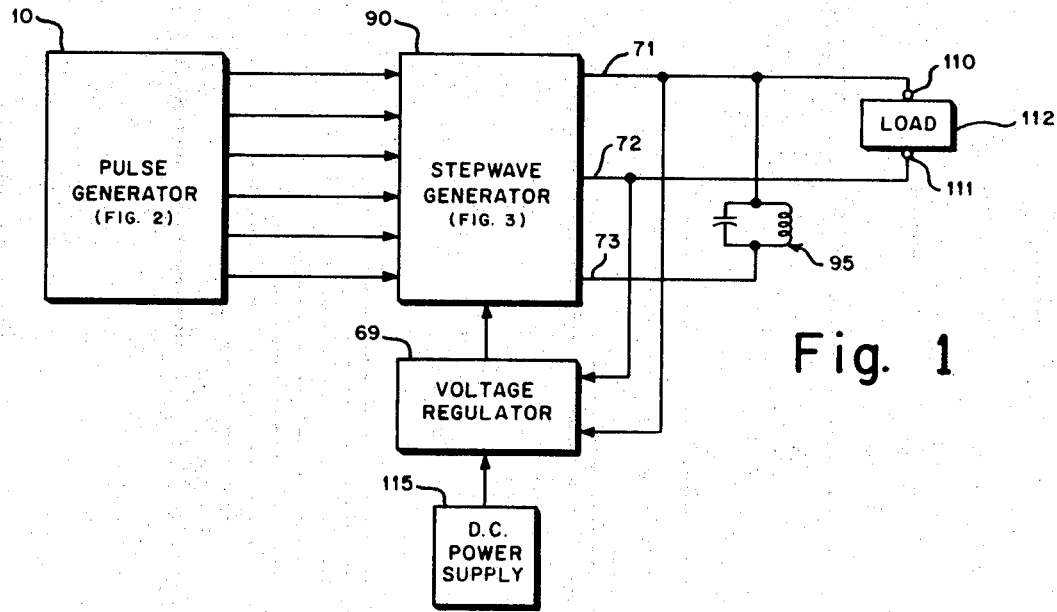
FIG. 1 is a block diagram of one embodiment of the invention.

Referring now to FIGS. 1, 2 and 3 there is shown a pulse generator 10 which includes a unijunction oscillator 11 connected to a conventional divide by 12 counter 12. A DC power supply 25 is connected to both oscillator 11 and counter 12. The counter 12 provides four outputs A, B, C and D with each output connected to an input of 12 NAND-gates 13–24, inclusive, making a total of 48 connections. The graphic symbols used for the logic components on the figures conform to MIL-STD-806B 26 Feb. 1962. The "1"s indicate high level pulses and the "0"s indicate low level pulses. The operation of counter 12 and NAND-gates 13–24, inclusive, is shown in the following table:

| Sample periods | Counter outputs | | | | NAND gates outputs | | | | | | | | | | | |
|---|---|---|---|---|---|---|---|---|---|---|---|---|---|---|---|---|
| | D | C | B | A | 13 | 14 | 15 | 16 | 17 | 18 | 19 | 20 | 21 | 22 | 23 | 24 |
| $t_1$–$t_2$ | 0 | 0 | 0 | 1 | 0 | 1 | 1 | 1 | 1 | 1 | 1 | 1 | 1 | 1 | 1 | 1 |
| $t_2$–$t_3$ | 0 | 0 | 1 | 0 | 1 | 0 | 1 | 1 | 1 | 1 | 1 | 1 | 1 | 1 | 1 | 1 |
| $t_3$–$t_4$ | 0 | 0 | 1 | 1 | 1 | 1 | 0 | 1 | 1 | 1 | 1 | 1 | 1 | 1 | 1 | 1 |
| $t_4$–$t_5$ | 0 | 1 | 0 | 0 | 1 | 1 | 1 | 0 | 1 | 1 | 1 | 1 | 1 | 1 | 1 | 1 |
| $t_5$–$t_6$ | 0 | 1 | 0 | 1 | 1 | 1 | 1 | 1 | 0 | 1 | 1 | 1 | 1 | 1 | 1 | 1 |
| $t_6$–$t_7$ | 1 | 0 | 0 | 0 | 1 | 1 | 1 | 1 | 1 | 0 | 1 | 1 | 1 | 1 | 1 | 1 |
| $t_7$–$t_8$ | 1 | 0 | 0 | 1 | 1 | 1 | 1 | 1 | 1 | 1 | 0 | 1 | 1 | 1 | 1 | 1 |
| $t_8$–$t_9$ | 1 | 0 | 1 | 0 | 1 | 1 | 1 | 1 | 1 | 1 | 1 | 0 | 1 | 1 | 1 | 1 |
| $t_9$–$t_{10}$ | 1 | 0 | 1 | 1 | 1 | 1 | 1 | 1 | 1 | 1 | 1 | 1 | 0 | 1 | 1 | 1 |
| $t_{10}$–$t_{11}$ | 1 | 1 | 0 | 0 | 1 | 1 | 1 | 1 | 1 | 1 | 1 | 1 | 1 | 0 | 1 | 1 |
| $t_{11}$–$t_{12}$ | 1 | 1 | 0 | 1 | 1 | 1 | 1 | 1 | 1 | 1 | 1 | 1 | 1 | 1 | 0 | 1 |
| $t_{12}$–$t_1$ | 0 | 0 | 0 | 0 | 1 | 1 | 1 | 1 | 1 | 1 | 1 | 1 | 1 | 1 | 1 | 0 |

Figure 4:
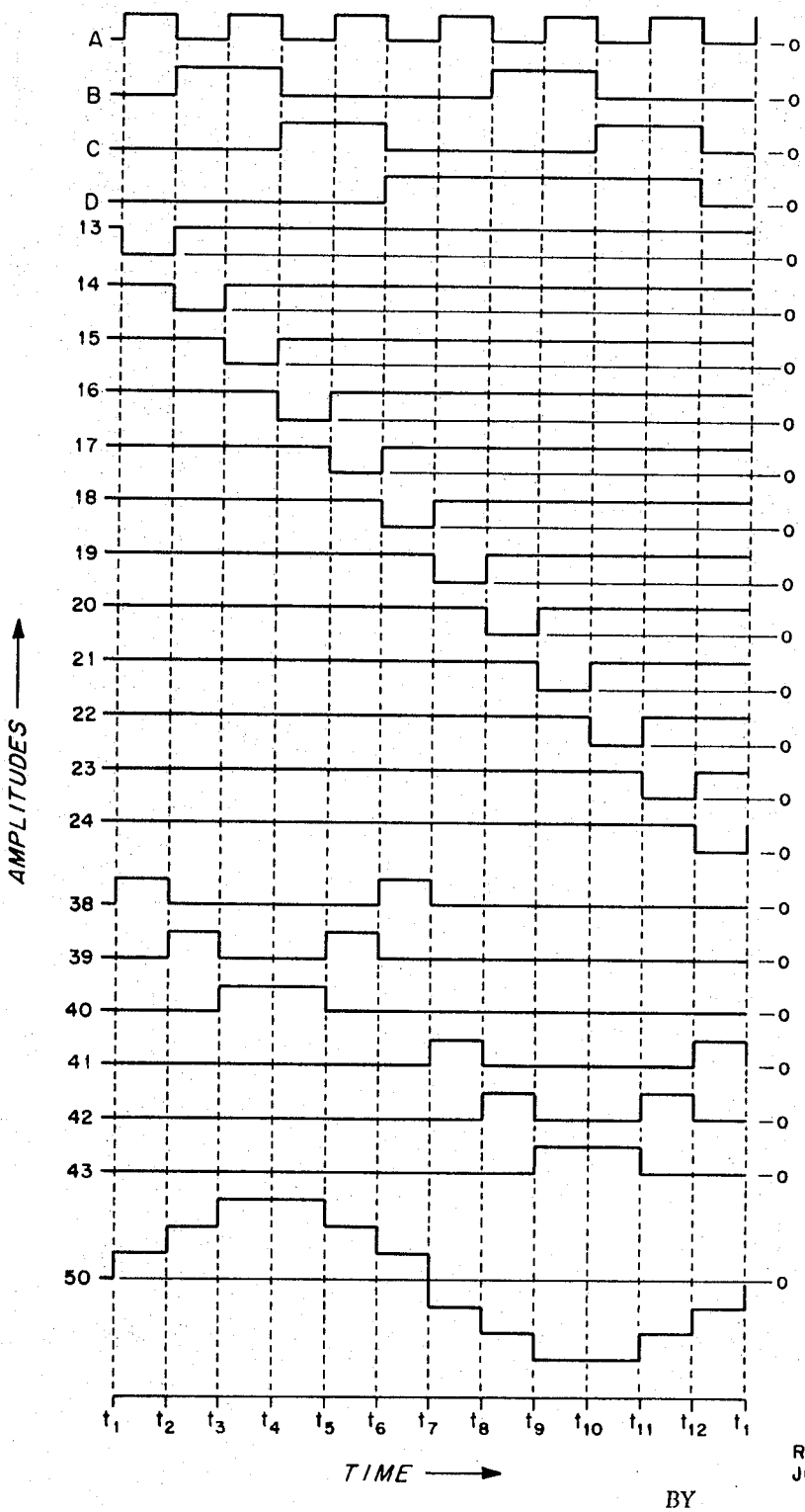
FIG. 4 is a representation of typical signals as applied to the embodiment of FIG. 1.

The table shows substantially the same information on the counter 12 and NAND-gates 13–24, inclusive, that is shown graphically in FIG. 4. The outputs are shown broken down into 12 time periods. Each period representing one cycle operation of the 4,800 cps. oscillator 11. It can therefore be seen that the entire sequence shown repeats at the rate of 400 cps.

The outputs of the NAND-gates 13–24 are applied to respective identical identical inverter amplifiers 26–37. The outputs of inverter amplifiers 26–37 are connected to the inputs of selected OR gates 38–43, inclusive, with inverter amplifiers 26 and 31, 27 and 30, 28 and 29, 34 and 35, 33 and 36, 32 and 37 respectively connected to OR gates 38, 39, 40, 41, 42 and 43.

The outputs of OR-gates 38–43, inclusive, as shown in FIG. 2 are connected to identical amplifiers 44 whose outputs are supplied to terminals 46–51, inclusive, of generator 10.

A step wave generator 90 includes six identical transformers 45 that have their primary windings connected respectively to terminals 46–51, inclusive, and their secondary windings connected between the base and emitter electrodes of respective PNP power transistors 52–57, inclusive. The collector terminals of the power transistors are connected to respective taps 59–64, inclusive, on the primary winding 66 of transformer 58. A center tap 74 on the primary winding 66 is connected to ground. The winding 66 is divided between taps into sections 80–85, inclusive.

The secondary winding 65 of transformer 58 providing the output of step wave generator 90 has multiple taps 71, 72 and 73 with taps 71 and 72 connected to the system output terminals 110 and 111 with a load 112 connected across the terminals.

A parallel filter circuit 95 comprising an inductor 67 and capacitor 68 of such values so as to provide resonance at 400 cps. is connected to taps 71 and 73. A DC power supply 115 is connected to provide power to a voltage regulator 69. The voltage regulator 69 is connected across the output load 112 for sensing the output signal and in addition for controlling the voltage supplied to the primary winding 66 of transformer 58 through transistors 52 57, inclusive.

The operation of the above-described embodiment will now be described as applied to typical signals. A DC input is provided to both oscillator 11 and counter 12 by means of DC power supply 25. Oscillator 11 provides a 4,800 cps. signal to counter 12. The outputs A, B, C and D of counter 12 are then applied to NAND-gates 13-24, inclusive. It is obvious that a counter with other combinations of binary signals can be used without departing from the scope of the invention.

Referring to FIG. 2, at time interval $t_1-t_2$ NAND-gate 13 receives a "1" pulse from A and "0" from B, C and D. The "0" pulses B, C and D are inverted to "1" pulses at the input to NAND-gate 13 so that an output pulse appears. This output pulse is inverted so that a "0" pulse appears at the output of NAND-gate 13. In similar fashion it can be shown that the remaining NAND-gates 14-24, inclusive, are pulsed in sequence.

Inverter amplifiers 26-37 then invert the signals received from NAND-gates 13-24 and provide outputs to selected OR-gates 38-43, inclusive. The outputs of OR-gates 38-43 are then applied to amplifiers 44 for suitable amplification to provide proper interface with the remaining components.

The outputs of the amplifiers 44 appearing on terminals 46-51, inclusive, provide the output signals of the pulse generator 10. These signals are applied to identical transformers 45 so that when a pulse appears at any of the terminals 46-51, a signal is generated in the secondary winding of the connected transformer 45 and applied to the respective one of transistors 52-57 to bias the transistor into its conducting state. This in turn permits power from voltage regulator 69 to be applied to the primary windings of transformer 58. To be more specific the operation of transistor 52 places a voltage from voltage regulator 69 on sections 80, 81 and 82 of winding 66. The operation of transistor 53 places a voltage from voltage regulator 69 on sections 81 and 82, etc. It can therefore be seen that the operation of transistors 54 or 55 provide a maximum output voltage to the secondary winding 65 since the turns ratio of $N_2$ to $N_1$ would be highest upon the operation of these transistors. It can likewise be seen that the operation of either transistor 52 or 57 would provide the smallest output voltage in the secondary of transformer 58. The operation of the respective transistors follows that shown in FIG. 2 for respective OR-gates 38-43, inclusive, and from this it can be seen that this will generate in the secondary of transformer 58 the step waveform shown. A step waveform as shown in FIG. 2 is known to be rich in odd harmonics and only the first harmonic, the 400 cycle signal, is wanted at the load 112. The parallel circuit 95 comprising of inductor 67 and capacitor 68 is chosen so as to provide a high impedance resonance to the first harmonic, while providing in effect a short circuit to all higher harmonics in the step wave generated. The higher harmonics generated will circulate around a closed loop comprising winding 65 in series with the parallel combination of inductor 67 and capacitor 68. As a result only the first harmonic of the generated waveform will appear at the load 112. A filter circuit 95 with a relatively high Q should be chosen because it is the third harmonic, the 1,200 cps. signal which must see a low impedance in the closed loop if a high quality sine wave is to be obtained. The voltage regulator 69 senses the output signal going to load 112 and, accordingly, adjusts the input voltage to the primary side of the transformer so that the proper output voltage may be maintained.

Figure 5:
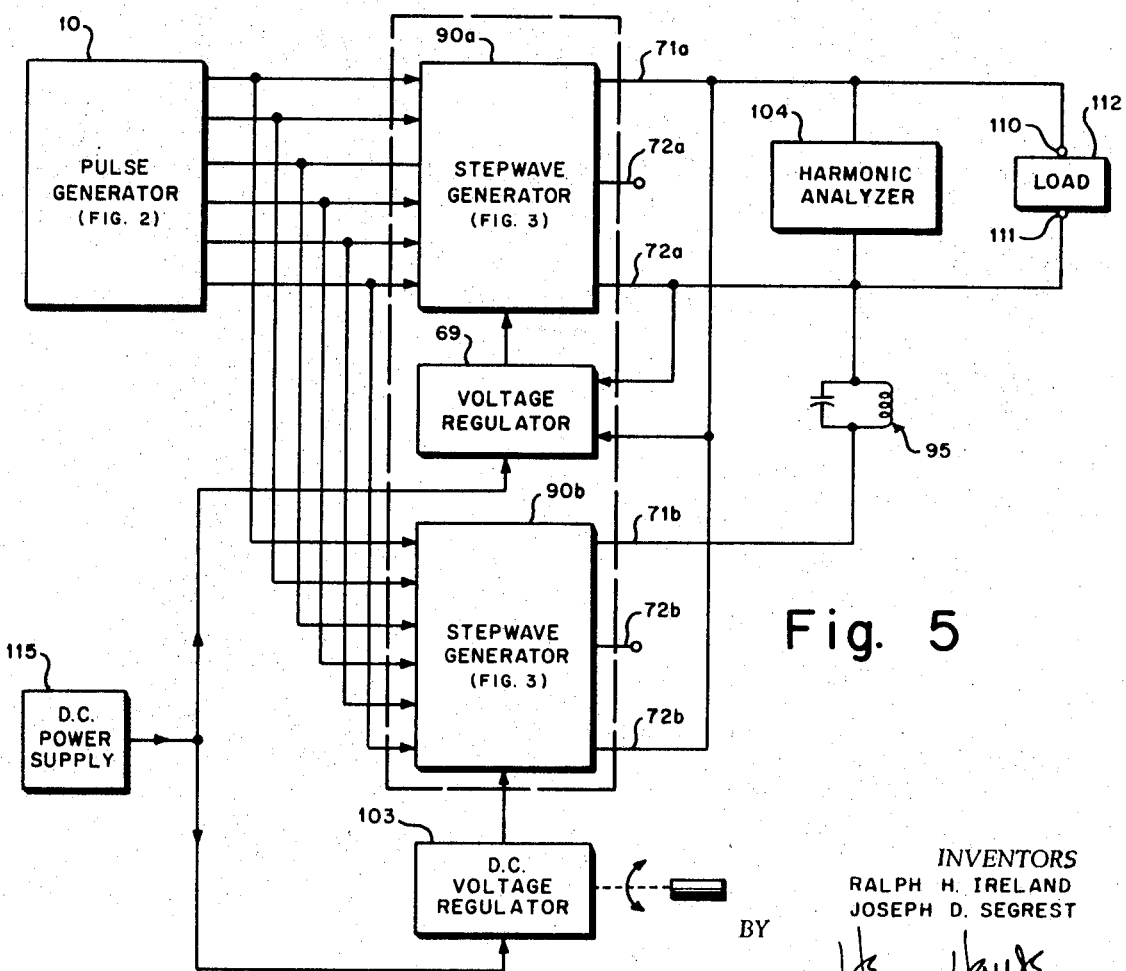
FIG. 5 is a block diagram of a second embodiment of the invention.

A second embodiment of the invention is shown in FIG. 5 in which similar components to those in FIG. 1 have the same numerical designation. Some of the components also have letters following such numerical designation for the purpose of aiding in identification.

A pulse generator 10 provides outputs to its terminals 46-51. Two lines are connected to each of the terminals 46-51 with one line from each terminal going to step wave generators 90a and 90b. Generator 90a has output terminals shown as 71a, 72a and 73a. Generator 90b has output terminals shown as 71b, 72b and 73b.

The output of step wave generator 90a is connected from terminals 71a and 73a to output terminals 110 and 111 that have a load 112 across them. The output terminals 71a and 73a of generator 90a are also connected to the respective output terminals 73b and 71b of generator 90b so that the step waves generated by both generators are 180° out of phase. In addition, a filter network 95 is connected between terminals 73a and 71b of generators 90a and 90b. An automatic voltage regulated power supply 69 is connected across output terminals 71a, 73a and, in addition, supplies power to step wave generator 90a in the same manner as generator 90. A variable DC power supply 103 has its supply leads connected to generator 90b in the same manner as voltage regulator 69 supplies generators 90 and 90a. An harmonic analyzer 104 is connected across the terminals 110 and 111.

The operation of the embodiment of FIG. 3 will now be described. Pulse generator 10 provides output pulses of the same sequence as in the embodiment of FIG. 1 to terminals 46-51. These pulses are applied to generators 90a and 90b in the same manner as generator 90 so as to generate step wave signals. The generators 90a and 90b are connected to each other at their outputs in such manner that the generated waves are 180° out of phase and therefore aid in canceling each other. A modification of the step wave generated by 90b is to be supplied to the secondary windings of 90a as the filter circuit 95 provides a high impedance resonant circuit to the first harmonic of the generated wave steps. Therefore, the first harmonic of the step wave generated by generator 90b is greatly attenuated. The higher harmonics generated by generator 90b are supplied to the secondary winding of the transformer of generator 90a and these harmonics being out of phase with the harmonics generated in generator 90a tend to cancel out all higher harmonics leaving only the first harmonic sine wave of the step wave generated by generator 90a. The voltage regulator 69 senses the voltage received at the load 112 and adjusts the input to generator 90a in order to maintain a constant output. The harmonic analyzer 104 placed across output terminal terminals 110 and 111 indicates the presence of higher harmonic signals in the output so that an operator of the device may adjust the input to generator 90b from the variable DC supply 103 in order to provide maximum cancellation of the higher harmonic signals.

Thus, two embodiments of a static sine wave generator for use at high altitudes with retrofit for existing systems has been described that generates a pure sine wave from DC voltage supplied without the use of any rotating equipment.

Many modifications and variations of the present invention are possible in the light of the above teachings. For example, since the first harmonic of the output of generator 90b was not used a smaller transformer than for generators 90 or 90a could be used. Also the harmonic analyzer 104 may be replaced by a phase sensitive harmonic detector used to control the output from the DC supply 103 so as to automatically null the output from the voltage. Accordingly, it is to be understood that within the scope of the appended claims the invention may be practiced otherwise than as specifically described.

What is claimed is:

1. A static inverter for providing a sine wave output signal comprising:
   pulse generating means for supplying at a plurality of output terminals a series of predetermined sequential output pulses;
   switching means receiving said output pulses for providing sequentially a first DC power supply at respective ones of a plurality of output terminals thereof; and
   sine wave-generating means receiving said supply at respective ones of a plurality of input terminals and having a transformer including multiple taps spaced on the primary winding respectively connected to said input terminals, and first, second and third spaced taps on the secondary winding of said transformer, said second tap being connected intermediate of said first and third taps, and filter means connected between said first and third taps for providing a sine wave output signal at said first and second taps.

2. A static inverter according to claim 1 wherein said filter means further comprises:
a capacitor and inductor connected in parallel between said first and third taps with a resonance at the sine wave output frequency.

3. A static inverter according to claim 2 wherein said switching means further comprises:
a first DC power supply means for providing said first DC power supply;
a voltage regulator connected to receive said first DC power supply and said sine wave output signal for regulating the voltage of said first DC power supply in response to the magnitude of said sine wave output signal; and
a plurality of transistors with input terminals operatively connected to said pulse-generating means output terminals and said voltage regulator for sequentially providing said first DC power supply at respective ones of said plurality of switching means output terminals.

4. A pulse generator according to claim 4 wherein said pulse-generating means further comprises:
a second DC power supply means for providing a second DC power supply;
a unijunction oscillator connected to receive said second DC power supply for providing pulse signals;
a divider counter connected to receive said second DC power supply and said oscillator pulse signals for providing sequential binary signals;
a plurality of NAND gates with each said NAND gate connected to receive said sequential binary signals and respectively providing spaced pulse output signals at a frequency of said oscillator pulse signals divided by the number of said NAND gates;
a plurality of OR gates with each said OR gate operatively connected to receive said spaced output signals from a plurality of said NAND gates for supplying at a plurality of said pulse-generating means output terminals a series of predetermined sequential output pulses.

5. A static inverter for providing a sine wave output signal comprising:
a pulse-generating means for supplying at a plurality of output terminals a series of predetermined sequential output pulses;
switching means receiving said output pulses and having a first DC power supply means for providing a first DC power supply, a voltage regulator connected to receive said first DC power supply and a sine wave output signal for regulating the voltage of said first DC power supply in response to the magnitude of said sine wave output signal, a variable DC voltage supply connected to receive said first DC power supply for adjusting the voltage of said first DC power supply, a first plurality of transistors with input terminals operatively connected to said pulse-generating means output terminals and said voltage regulator for sequentially providing said first DC power supply at respective output terminals of said first plurality of transistors, and a second plurality of transistors with input terminals operatively connected to said pulse-generating means output terminals and said variable DC voltage supply for sequentially providing said first DC power supply at respective output terminals of second plurality of transistors; and
sine wave-generating means receiving said DC supply having first and second transformers, said first and second transformers each include multiple taps spaced on the primary windings respectively connected to said input terminals, and two spaced taps on the secondary windings, said two spaced taps of said first transformer operatively connected to said two spaced taps of said second transformer so that signals generated by said first and second transformers are 180° out of phase with each other, and a filter means having a capacitor and inductor connected in parallel between said first and second transformers two spaced taps with a resonance at the sine wave output frequency for providing the sine wave output signal at said first transformer.

6. A pulse generator according to claim 5 wherein said pulse generating means further comprises:
a second DC power supply means for providing a second DC power supply;
a unijunction oscillator connected to receive said second DC power supply for providing pulse signals;
a divider counter connected to receive said second DC power supply and said oscillator pulse signals providing sequential binary signals;
a plurality of NAND gates with each said NAND gate connected to receive said sequential binary signals and respectively providing spaced pulse output signals at a frequency of said oscillator pulse signals divided by the number of said NAND gates;
a plurality of OR gates with each said OR gate operatively connected to receive said spaced pulse output signals from a plurality of said NAND gates for supplying at a plurality of said pulse generating means output terminals a series of predetermined sequential output pulses.

7. A static inverter according to claim 6 further comprising:
a harmonic analyzer connected to said first transformer secondary windings for sensing the presence of higher harmonics in said output sine wave signal.

8. A static inverter for providing a sine wave output signal comprising:
pulse-generating means for supplying at a plurality of output terminals a series of predetermined sequential output pulses;
switching means receiving said output pulses for providing sequentially a first DC power supply at respective ones of a plurality of output terminals thereof; and
sine wave-generating means having first and second transformers with input terminals having multiple taps spaced on each transformer primary winding sequentially receiving said first DC power supply and two spaced taps on each transformer secondary winding, one secondary winding spaced tap of said first transformer operatively connected to one secondary winding spaced tap of said second transformer with a filter means for blocking a predetermined frequency and passing higher harmonics of the predetermined frequency connected therebetween, the other secondary winding spaced tap of said first transformer connected to the other secondary winding spaced tap of second transformer, the interconnection of said secondary windings spaced taps being so that signals generated by said first and second transformers are 180° out of phase with each other for providing a sine wave output signal.